Patented Feb. 3, 1942

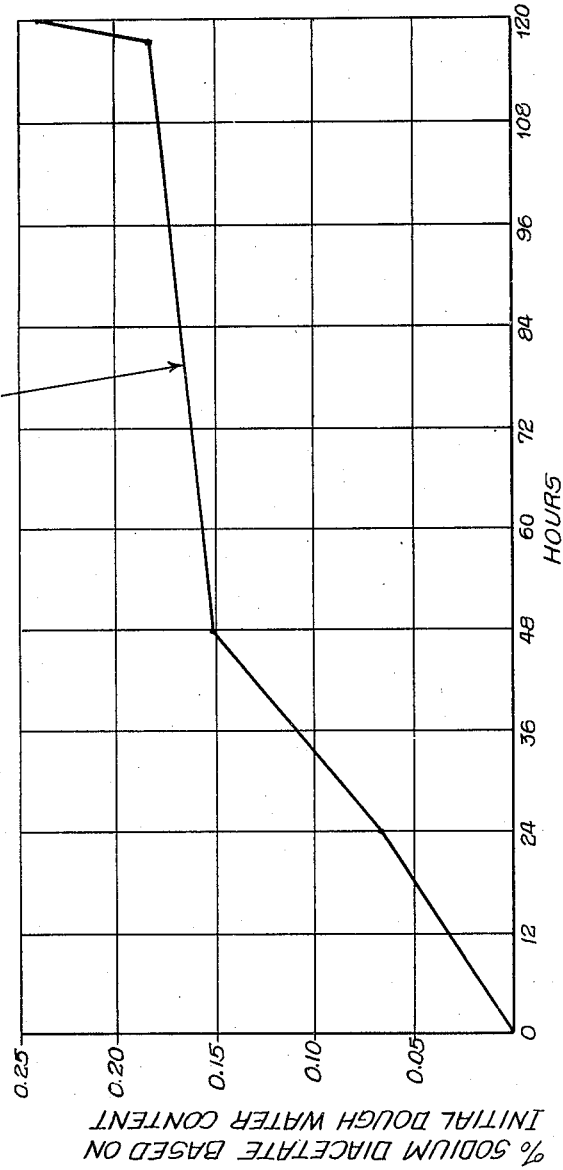

2,271,756

UNITED STATES PATENT OFFICE 2,271,756

PREPARATION OF BAKERY PRODUCTS

Hans F. Bauer and Elmer F. Glabe, Chicago, Ill., assignors to Stein, Hall Manufacturing Company, Chicago, Ill., a corporation of Delaware Application June 12, 1939, Serial No. 278,588

19 Claims. (Cl. 99—91)

This invention relates to the preparation of bakery products including cakes, biscuits and especially breads which may be either of an enzyme leavened or chemically aerated nature.

Constant improvements in the art of bread baking have developed it to an extremely high state. As is well known, the primary base material for making bread is flour, which in turn consists primarily of starch and proteidal substances. The customarily auxiliary materials used in addition to flour are water, yeast, yeast food, shortening, milk, sugar, salt and sometimes small amounts of malt. According to one standard method of making bread, a portion of the flour together with water, yeast and yeast food are made into a sponge. The sponge is then allowed to ferment for a period of time, say, 4 to 6 hours, during which period the natural sugars formed and the yeast food act with the yeast to cause the evolution of carbon dioxide gas. If malt is employed, the diastatic enzymes therein assist in converting the starch by hydrolysis into maltose, dextrine and malto-dextrines, a change which within limits is favored by the hydrogen ion ($H^+$) and restrained by the hydroxyl ion ($OH^-$).

After the sponge fermentation stage, the next stage of bread making is usually the dough stage, where the remainder of the flour is incorporated together with shortening, milk, sugar and salt. The dough is then allowed to ferment over a varying period of time, which may be from, say, 15 minutes to 1 hour, and this stage is known as the dough fermentation stage. From the dough fermentation stage, the dough is passed to a divider which cuts it into equal pieces, then to a rounder, then to another fermentation stage which may be, for example, from 15 minutes to 45 minutes, and then to a molder where it is shaped into cylinder form. It will be understood of course that molders, dividers and rounders are employed in commercial practice, while in home baking the same results are accomplished by other available means. After the bread is molded or shaped it is customary commercially to pass it to a proofing cabinet where it is maintained at a relatively high humidity, say, around 70%, at a temperature of around 100° F. Thereafter, the bread is passed to the oven and is baked. The principal characteristics or properties by which bread is judged as to quality are shape, volume, richness and tenderness of crust, smoothness and softness of texture, closeness of grain, keeping qualities and crumb color.

In spite of the fact that standard methods of baking have been developed, the result obtained may vary rather widely depending upon the flour itself and upon the auxiliary substances other than standard ingredients used in bread baking. The protein or gluten content of the flour, for example, may be an essential factor in contributing to a bad result. For this reason, certain methods have been proposed for modifying the protein content of the flour. Some flours are soft, others are hard and unless the protein content of the flour is properly modified, the resultant loaf of bread may not be well shaped, have proper volume, smooth soft texture, or close grain. Likewise, the bread making process from the sponge stage through the dough stage and the various fermentation stages requires the presence of ingredients which will insure a constantly evolving supply of gas or otherwise the shape, volume, texture and grain of the loaf will be affected. One of the factors which may affect the result is proteolysis or the conversion of proteins into soluble peptones by decomposition or hydrolysis of the protein molecule. Enzymes which bring about hydrolysis of proteins are usually referred to as proteolytic enzymes. Proper action of such enzymes is also important in making the better types of bread. The color of the bread is determined to a large extent by the nature of the flour and more particularly by the carotin contained therein, which has a distinct tendency to lessen the whiteness of the bread.

With the foregoing considerations in mind it has been one of the objects of the present invention to provide a new and improved method of making bread and other bakery products which are made from flour by the simple addition of a single ingredient as an auxiliary agent which will serve the purpose of producing a combined improvement, not in just one phase of bread making, but in several phases.

Another object has been the provision of a new and improved process of making bread by the use of a new ingredient in conjunction with other ingredients and which is compatible with the other ingredients and exercises not only an independent action of its own but also a cooperative action with other ingredients present.

Still a further object of this invention has been to incorporate into the bread making process an agent which will tend to produce a bread of whiter crumb color.

Another object has been the incorporation into the bread making process of an agent which in addition to improving other phases of the process is a pronounced aid to fermentation and also acts as a promoter for proteolytic activity.

An additional object is the provision of a new and improved method of making bread by utilizing an agent which assists in mellowing the gluten contained in the flour apparently by increasing the hydrating effect of the gluten thereby causing the gluten to hold more water and hence increasing the keeping qualities and softness of the bread.

Another object is to provide a novel method of producing a close grained loaf of bread.

Still a further object of the invention is to provide a method and to produce bread in which the formation of rope and mold is inhibited or controlled. Other objects will appear hereinafter.

In the practice of this invention these objects are accomplished by incorporating into the bread making process either in the sponge stage, the dough stage, or at some other stage, an acetate containing undissociated acetic acid in its molecule.

The preferred salt sodium diacetate may be given the formula:

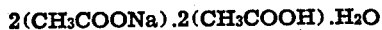

$$2(CH_3COONa) \cdot 2(CH_3COOH) \cdot H_2O$$

Tests which have been made, as more fully hereinafter described, clearly demonstrate that the addition of this ingredient in the bread making process in proper amounts produces a pronounced improvement in certain phases of the process and in the result obtained.

Among the particular improved results which have been noticed are better keeping qualities and whiter crumb color. Independent tests which have been conducted in connection with this invention have shown that sodium diacetate has a pronounced whitening or bleaching effect upon substances such as carotin, which ordinarily tend to reduce whiteness. This whitening effect brought about by the use of sodium diacetate is increased if certain types of yeast foods are employed, for example, a type of yeast food sold under the name of "Arkady." A typical yeast food of this type, for instance, might have the following composition:

FORMULA A

| | Parts |
|---|---|
| Calcium sulfate | 25 |
| Sodium chloride | 25 |
| Potassium bromate | 0.24 |
| Corn or wheat flour | 30 |
| Moisture | 10 |

Thus, the ingredient employed in accordance with the present invention not only is compatible with other ingredients employed in bread making, but cooperates with them to produce a still greater effect of the type desired. Since sodium diacetate is acidic by nature, it tends to aid fermentation caused by diastatic action. For the purpose of this invention it is therefore preferably employed in conjunction with an auxiliary ingredient of bread making compounded as follows:

FORMULA B 0 to 80 parts dextrine, preferably a high soluble dextrine

About 5 to about 25 parts malted cereal flour

About 5 to about 80 parts partially dextrinized cereal flour having its gluten content mellowed, as described, for example, in U. S. Patent 2,113,570

0 to 80 parts unmodified cereal flour

When used in conjunction with the combination of substances in Formula B, the sodium diacetate also assists in the mellowing action of the gluten modified flour on untreated flour by increasing the hydrating effect, thereby causing the gluten to hold more water and hence increasing the keeping qualities and softness of the bread. The composition of Formula B forms the subject matter of a copending application, Serial No. 148,066, filed June 14, 1937, now matured into U. S. Patent No. 2,197,784, of which one of the inventors herein is an inventor. Such a composition is ordinarily used in bread baking in the proportion of 1% to 10% by weight of the flour employed.

For the purpose of the present invention, it is preferable, although not essential, that sodium diacetate be intimately incorporated with Formula B. The amount of sodium diacetate used in conjunction with Formula B is subject to variation and may be changed according to the results desired. Thus, 2% by weight or even somewhat less sodium diacetate, based on a composition of the type given in Formula B, is effective where, say, 4% of the composition, based upon the weight of flour, is used in baking bread. This corresponds to about 0.05% sodium diacetate per finished loaf of bread. This amount of sodium diacetate is effective in giving the bread a whiter color, aiding fermentation, promoting proteolytic activity and assisting in the hydration of the gluten.

In some cases a portion of the sodium diacetate or a composition containing it may be added in the sponge stage and in some instances it may be added in the dough stage, or a part may be added in each stage.

One of the further features of this invention is based upon the discovery that salts such as sodium diacetate have the property of inhibiting the growth of organisms causing ropiness and mold in bread. Ropiness is a stringiness or stickiness occurring in bread caused by the action of micro-organisms of the *Bacillus mesentericus* group, for example, *Bacillus mesentericus vulgatus*. As will readily be recognized, the formation of rope in bread is extremely objectionable and makes the bread practically unsaleable as well as unwholesome.

It has been found in accordance with this invention that sodium diacetate will retard the formation of rope and in sufficient amount will prevent such formation. While the amounts of sodium diacetate employed may vary, it has been found that an amount corresponding to about 0.08% per finished loaf of bread will definitely retard the formation of rope and 0.17% will definitely prevent the formation of rope over a period of at least 5 days. Where all of the sodium diacetate was added in the dough stage, smaller amounts, as, for example, .05% gave a definite and pronounced inhibiting effect and in general the effectiveness of the sodium diacetate in inhibiting rope was greater. Similar tests on mold development showed that sodium diacetate also is effective in inhibiting the growth of mold. This result is accomplished, moreover, without causing any ill effects on the finished loaf of bread. Certain substances which are widely used for addition to bread for the purpose of inhibiting rope and mold give the bread a bad taste and it is necessary to add some other substances to overcome or partially overcome the poor taste caused by the rope or mold inhibitor. With sodium diacetate the taste of the bread is not noticeably changed by the amounts required for the purpose of this invention.

In order to demonstrate the improved results obtained in accordance with this invention, a number of tests were made, as illustrated by the following examples, which are not intended to limit the invention.

EXAMPLE I

In this example the influence of sodium diacetate on the proteolytic activity of flour dough was tested under various conditions. The proteolytic activity was determined by the method of Swanson and Tague, "Cereal Laboratory Methods," 3rd edition, published by the American Association of Cereal Chemists, 1935. In carrying out these tests control samples were made in each test with 25 grams of flour having a 15% moisture content and 100 cc. of a 0.5% yeast suspension which was placed in a bottle having a screw top. The mixture was then thoroughly shaken. The bottle was placed in a water bath heated to 95°–97° F. for two hours, during which time it was shaken several times.

After two hours the suspension was centrifuged in a digestion bottle for 10 minutes. Then 50% of the supernatant liquid was pipetted off and titrated with 0.1N sodium hydroxide solution against phenolphthalein. When the neutrality point was reached, 10 cc. of neutral formaldehyde was introduced and the mixture allowed to stand for 5 minutes, after which time it was titrated with 0.01N sodium hydroxide solution to a distinct rose red color.

The first titration is a measure of the titratable acidity. The second titration is a measure of the amino acids produced by proteolytic enzyme activity on the flour protein.

The sodium diacetate was incorporated into various samples of flour as a part of formulae similar to Formula B, mentioned above. The following formula was used in incorporating the sodium diacetate with samples of flour:

FORMULA C

| | Per cent |
|---|---|
| Partially dextrinized gluten modified corn flour | 50 |
| High soluble dextrine | 43 |
| Malted wheat flour | 5 |
| Sodium diacetate | 2 |

The following results were observed:

Table I

| Test No. | Ingredients | Initial acidity | Proteolytic activity |
|---|---|---|---|
| 1 | Hard wheat No. 1 flour (control) | 15.8 | 5.4 |
| 2 | Hard wheat No. 1 flour+2.5% Formula C. | 16.0 | 6.0 |
| 3 | Hard wheat No. 2 flour (control) | 18.0 | 9.4 |
| 4 | Hard wheat No. 2 flour+2.5% Formula C. | 23.8 | 17.8 |
| 5 | Hard wheat No. 2 flour+5% Formula C. | 27.8 | 19.0 |
| 6 | Hard wheat No. 3 flour (control #1) | 9.2 | 2.1 |
| 7 | Hard wheat No. 3 flour+.3 gram partially dextrinized gluten modified corn flour. | 17.8 | 3.0 |
| 8 | Hard wheat No. 3 flour (control #2) | 17.0 | 3.8 |
| 9 | Hard wheat No. 3 flour+.015 gram sodium diacetate. | 19.6 | 7.2 |
| 10 | Hard wheat No. 3 flour+.030 gram sodium diacetate. | 18.6 | 5.6 |
| 11 | Hard wheat No. 3 flour+.045 gram sodium diacetate. | 19.6 | 4.6 |
| 12 | Hard wheat No. 3 flour+.060 gram sodium diacetate. | 20.6 | 4.6 |
| 13 | Hard wheat No. 3 flour+.075 gram sodium diacetate. | 21.6 | 4.6 |

The quantities given in the above table are calculated on the basis of the original flour base or 25 grams of flour (15% moisture content). From the foregoing data it is apparent that sodium diacetate has a pronounced effect upon proteolytic activity. This is particularly evident from the tests in which sodium diacetate alone was added to the flour, namely, tests 9 to 13, inclusive. It is interesting to note that the accelerating effect occurs in small doses and apparently the optimum quantity in the tests given above seems to be somewhere between 0.015 gram and 0.030 gram. Larger amounts appear to have a more or less constant effect. On the basis of flour, the preferred amounts of sodium diacetate to increase proteolytic activity are from about 0.06% to about 0.12%.

EXAMPLE II

The general bactericidal properties of sodium diacetate were determined on agar plates adjusted to a pH of 7.00. All plates were innoculated with 1 cc. of a physiological salt solution containing a large number of bacteria of different varieties. The sodium diacetate solutions were prepared from sterile water in the following concentrations:

Table II

No. 1— 50 grams sodium diacetate per 100 cc. water
No. 2— 10 grams sodium diacetate per 100 cc. water
No. 3— 5 grams sodium diacetate per 100 cc. water
No. 4— .1 gram sodium diacetate per 100 cc. water
No. 5— .05 gram sodium diacetate per 100 cc. water
No. 6— .01 gram sodium diacetate per 100 cc. water Duplicate plates using 1 cc. of each of these solutions were made. The total weight of the medium, innoculum and sodium diacetate solution amounted to about 14 grams. The plates were incubated at 37.5° C. The results were as follows:

Table III—colonies

| | 24 hrs. | 48 hrs. | 72 hrs. | Percent sodium diacetate based on 14 g. medium |
|---|---|---|---|---|
| Control | 3,000 | 6,000 | 6,000 | |
| 1 cc. soln. #1 | —0— | —0— | —0— | 3.5 |
| 1 cc. soln. #2 | —0— | —0— | —0— | 0.7 |
| 1 cc. soln. #3 | —0— | —0— | —0— | .35 |
| 1 cc. soln. #4 | —0— | 600 | 600 | .07 |
| 1 cc. soln. #5 | —0— | 800 | 1,000 | .035 |
| 1 cc. soln. #6 | —0— | 3,000 | 4,000 | .007 |

From the foregoing table it will be observed that even very small amounts of sodium diacetate had a retarding effect on the development of the bacteria colonies. This retarding effect was very pronounced with as little as .07% of sodium diacetate and complete inhibition was obtained over a period of 72 hours with .35% sodium diacetate.

EXAMPLE III

The mold inhibition properties of sodium diacetate were determined first on prune agar plates adjusted to a pH of 4.0. This pH level successfully stopped all bacterial growth but allowed for good mold development. Duplicate plates using 1 cc. of the sodium diacetate solutions prepared as in Example II were made. Each plate was then inoculated by touching the medium surface at three places with a needle previously infected with mold of the Aspergillus and related types. These are common bread molds. The results were as follows:

Table IV—Mold growth

|  | 24 hrs. | 48 hrs. | 72 hrs. | Percent sodium diacetate |
|---|---|---|---|---|
|  | VL | VL | VL | —0— |
| 1 cc. soln. #1 | —0— | —0— | —0— | 3.5 |
| 1 cc. soln. #2 | —0— | —0— | —0— | 0.7 |
| 1 cc. soln. #3 | —0— | —0— | —0— | .35 |
| 1 cc. soln. #4 | F | L | L | .07 |
| 1 cc. soln. #5 | FL | VL | VL | .035 |
| 1 cc. soln. #6 | L | VL | VL | .007 |

L—Luxuriant growth.
F—Fair growth.
S—Slight growth.
—0— —No.
V—Very.

EXAMPLE IV

The growth inhibiting properties of sodium diacetate on *Bacillus mesentericus vulgatus*, one of the organisms causing ropiness in bread, were determined on nutrient agar plates, as follows:

Sodium diacetate solutions were prepared as in Example II in the following concentrations:

Table V

1  1 cc. containing .5 gram sodium diacetate
2  1 cc. containing .1 gram sodium diacetate
3  1 cc. containing .05 gram sodium diacetate
4  1 cc. containing .01 gram sodium diacetate
5  1 cc. containing .005 gram sodium diacetate
6  1 cc. containing .001 gram sodium diacetate
7  1 cc. containing .0005 gram sodium diacetate Quadruplicate plates were made using 1 cc. of each of the above solutions. One set of duplicate plates was inoculated with 1 cc. of a nutrient broth solution containing *Bacillus M. V.* in great numbers. Another set of duplicate plates was inoculated by streaking the surface of the medium with a needle previously infected with *Bacillus M. V.* The results were as follows:

Table VI—Colonies on inoculated plates

|  | 24 hrs. | 48 hrs. | 72 hrs. | Percent sodium diacetate |
|---|---|---|---|---|
| Control | 9,000 | 16,000 | 16,000 | —0— |
| 1 cc. soln. #1 | —0— | —0— | —0— | 3.5 |
| 1 cc. soln. #2 | —0— | —0— | —0— | 0.7 |
| 1 cc. soln. #3 | —0— | —0— | —0— | .35 |
| 1 cc. soln. #4 | —0— | 17 | 20 | .07 |
| 1 cc. soln. #5 | 3,000 | 7,500 | 8,000 | .035 |
| 1 cc. soln. #6 | 5,000 | 10,000 | 11,000 | .007 |
| 1 cc. soln. #7 | 6,000 | 14,000 | 15,000 | .003 |

Table VII—Growth on streaked plates

|  | 24 hrs. | 48 hrs. | 72 hrs. | Percent sodium diacetate |
|---|---|---|---|---|
| Control | L | L | L | —0— |
| 1 cc. soln. #1 | —0— | —0— | —0— | 3.5 |
| 1 cc. soln. #2 | —0— | —0— | —0— | 0.7 |
| 1 cc. soln. #3 | —0— | —0— | —0— | .35 |
| 1 cc. soln. #4 | S | S | S | .07 |
| 1 cc. soln. #5 | S | L | L | .035 |
| 1 cc. soln. #6 | VL | VL | VL | .007 |
| 1 cc. soln. #7 | VL | VL | VL | .003 |

L—Luxurious growth.
F—Fair growth.
S—Slight growth.
—0— —No growth.
V—Very.

In every test sodium diacetate retarded or prevented bacterial growth when used at the rate of .01 to .05 gram per cc. This ranges from .07% to .3%, based on the total weight of the culture medium.

EXAMPLE V

This example illustrates the rope inhibition properties of sodium diacetate using bread as a medium. The bread was baked using a standard sponge and dough formula. One half of the sodium diacetate ingredient was placed in the sponge, the other half in the dough stage, except where otherwise specified. Forty-five (45) minutes after its removal from the oven a hole was punched into the middle of the top crust penetrating to the center of the loaf, then 0.25 cc. of a nutrient broth solution rich in *Bacillus M. V.* bacteria was pipetted into this hole. The bread was then wrapped and incubated at 50° C. and the growth of rope bacteria determined by odor.

The following table illustrates the result obtained:

Table VIII

| No. | Yeast food formula A | Sodium diacetate per finished loaf | Sodium diacetate based on formula C | 12 hrs. | 24 hrs. | 36 hrs. | 48 hrs. | 5 days |
|---|---|---|---|---|---|---|---|---|
|  | Percent | Percent | Percent |  |  |  |  |  |
| 1 (control) | .25 | None | None | + | + | + | + | + |
| 2 (control) | .5 | .05 | 2 | ? | + | + | + | + |
| 3 (control) | .5 | .08 | 3 | — | — | ? | + | + |
| 4 (control) | 1.0 | .08 | 3 | — | — | — | — | + |
| 5 (control) | .5 | .11 | 4 | — | — | — | ? | + |
| 6 (control) | .5 | .14 | 5 | — | — | — | — | ? |
| 7 (control) | .5 | .17 | 6 | — | — | — | — | — |
| 8 (control) | 1.0 | .17 | 6 | — | — | — | — | — |
| 9 (control) | .5 | .25 | 10 | — | — | — | — | — |
| 10 (control) | .5 | .50 | 20 | — | — | — | — | — |
| 11 all in dough | .5 | .05 | 2 | — | — | — | + |  |
| 12 all in dough | .5 | .08 | 3 | — | — | — | — |  |

+ = Development of rope bacteria.
− = no development of rope bacteria.
? = probable development.

It will thus be seen that rope in bread is retarded by the addition of a .08% sodium diacetate based on the finished bread. It is completely inhibited by a .17% sodium diacetate based on the finished bread up to a period of 5 days. A yeast food of the type given in Formula A for an unknown reason seems to increase the effectiveness of the sodium diacetate (see tests 3 and 4 of Table VIII). It will be observed that the results in plating agree quite closely with those obtained in the bread. In plating the general bacteria and the specific bacteria *Bacillus M. V.*, it was found that 0.07% retarded growth and 0.2% stopped all growth. According to these tests, therefore, the effectiveness of sodium diacetate increases with increments up to about 0.2% beyond which added amounts have very little increased effect on rope.

Example VI

This example illustrates the mold inhibiting properties of sodium diacetate using bread as a medium. The bread was baked using a standard formula by the sponge and dough method. One half of the sodium diacetate ingredient was placed in the sponge, the remainder in the dough stage. The finished loaves were infected on one side by touching with a mold infected needle. They were then wrapped immediately and incubated at 50° C. The results were as follows:

*Table IX*

| No. | Yeast food | Sodium diacetate per finished loaf | Sodium diacetate based on formula C | 5 days |
|---|---|---|---|---|
|  | Percent | Percent | Percent |  |
| 1 (control) | .25 | None | None | VL |
| 2 (control) | .5 | .05 | 2 | L |
| 3 (control) | .5 | .08 | 3 | F |
| 4 (control) | 1.0 | .08 | 3 | VL |
| 5 (control) | .5 | .11 | 4 | F |
| 6 (control) | .5 | .14 | 5 | F |
| 7 (control) | .5 | .17 | 6 | S |
| 8 (control) | 1.0 | .17 | 6 | F |
| 9 (control) | .5 | .25 | 10 | VS |
| 10 (control) | .5 | .50 | 20 | —0— |

L—Luxuriant growth.
F—Fair growth.
S—Slight growth.
V—Very.
—0——No growth.

From the foregoing table it will be apparent that mold retardation is evident in the bread when sodium diacetate is present as .08% of the finished product. It is very effective at a concentration of about .2%. This test also agrees with the tests made on plates except that the yeast food does not seem to have the same retarding effect on mold development that it has on rope bacteria when used in conjunction with sodium diacetate.

In the foregoing examples the sodium diacetate was incorporated into the bread in the form of a composition corresponding to Formula C except that the proportions of sodium diacetate were varied as shown in column 4 of Tables VIII and IX. The amount of this composition used was 5% based upon the weight of the flour used in making the bread and half the composition was added in the sponge and the other half in the dough stage, except in certain instances where all of it was added in the dough stage. A composition of this type containing 3% sodium diacetate definitely inhibited mold and rope and at the same time the other functions of the sodium diacetate were evident in aiding fermentation, inducing controlled proteolytic activity, increasing the water content of the gluten and producing a whiter crumb color.

The pH of the finished loaf of bread in the tests which were made varied from about 5.8 on control samples where no sodium diacetate was used, to about 5.15 with 0.5% sodium diacetate based on the finished loaf. The amount of moisture initially put into the dough in making the loaf was usually around 65%. The final moisture content was naturally much less, being not greater than 38% in any case. The acidity of the dough was of course higher than that of the finished bread.

In making the bread, 60% of the flour was added in the sponge stage and 40% in the dough stage. In the sponge stage there was also added water, about 2% yeast, about ⅓% to 2% yeast food, with or without the addition of sodium diacetate either as such or in a composition of the Formula C type. In the dough stage, there were added 40% of the flour together with water, 3% shortening, 3% to 6% milk, 4% to 6% sugar and 2% salt, with or without the addition of sodium diacetate either as such or in a composition of the type previously described.

In the accompanying drawing the graph illustrates the percentage of sodium diacetate required to stop rope formation over varying periods of time.

It will be recognized that the present invention is applicable to the manufacture of breads, pies, cakes and other pastry products and is especially valuable in making products made from fermented doughs, including ordinary breads of all types, as well as sour dough breads. In this respect the invention differs markedly from methods heretofore proposed involving the use of alkaline salts which would be neutralized by strongly acid doughs such as sour dough. Most white breads have a pH from about 5.1 to 6.0 and sodium diacetate is particularly effective in this range.

On the basis of flour used, .08% sodium diacetate will give a substantial improvement in bread baking in (1) whiter crumb color, (2) aiding fermentation, and (3) increased proteolytic activity. About 0.12% of sodium diacetate, based on flour, will produce sufficient retardation of the growth of rope and mold for most practical purposes, although it may be desirable to use as much as 0.24%, or somewhat more. The invention in its broader aspects is not limited to any particular amounts of ingredients. It is one of the advantages of the invention that the amount of the acetate salt can be varied to obtain different effects in bread baking because in some instances it may be important to improve one phase without greatly affecting another. Thus, where the inhibition of rope and mold is of little importance, the amount of sodium diacetate may conveniently be less than otherwise. The preferred amounts of acid salt of acetic acid are therefore from about 0.01% to 0.5% based on the flour.

The invention contemplates the preparation of various types of compositions containing sodium diacetate for use in making bakery products. In these compositions the diacetate is compatible with and cooperates with other ingredients of the composition to produce an improved result which cannot be obtained by the diacetate alone or by other ingredients of the composition alone. For instance, all yeast foods contain an ammonium salt and an oxidizing agent (e. g., potassium bromate in Formula A). The whitening effect on crumb color is substantially greater when both the diacetate and yeast food are used together in making bread than with either one alone.

The diacetate also cooperates with the other ingredients of Formulae B and C to produce results which are not obtained with the diacetate alone or with Formula B alone. In Formula B the various ingredients have a cooperating action with each other and with other materials used in making bakery products. The diacetate, when added to Formula B assists not only the diastatic action of the malt but also the mellowing, hydrating and softening action of the partially dextrinized cereal flour. The malt is thus aided in its action on the dextrine.

These cooperative actions among the various ingredients all contribute to the production of a finer quality, softer, better keeping and closer grained loaf of bread. The last named characteristic results from sustained gassing power and gluten mellowing properties in the several different stages of the bread making process and is brought about in the practice of this invention by using sodium diacetate in conjunction with Formula B. This characteristic is of outstanding important in bread making.

It will be understood that while the invention has been described with reference to the sponge and dough method of making bread, it is equally applicable to other methods of bread making including the straight dough, salt-rising dough and brake dough methods.

While the invention has been described specifically with reference to sodium diacetate because this is practically the only salt of this type available commercially today, it is also applicable to the other acetate salts of a similar nature. A number of sodium acetate-acetic acid-water systems are known to exist as mentioned by Beilstein, 4th edition, Vol. II, page 107. Solid salts containing combined but undissociated acetic acid can be prepared containing from, say, 20% to 40% available undissociated acid, but an acid sodium salt of acetic acid containing from about 25% to about 35% of available acetic acid is preferred for the purpose of this invention. The sodium diacetate now available commercially is said to contain 33% to 35% available acetic acid with a pH in 10% solution within the range of 4 to 5.5.

It will be recognized from the plate tests previously described that sodium diacetate may be used for inhibiting the growth of rope and mold not only in conjunction with the manufacture of bakery products but also in protecting materials susceptible to mold, such as fruits, paper, textiles, wood, vegetables, leather, butter, cheese, jellies and foodstuffs of all kinds, as well as adhesives and materials containing adhesives, for example, those made from starches, proteins and the like, with or without auxiliary materials. Sodium diacetate may be incorporated directly into the foodstuff or other material and distributed throughout said foodstuff or said other material either before or after processing, or it may be applied to the surface of a foodstuff, paper or other material in any suitable manner, for instance, by spraying a solution of diacetate thereon. The amount and concentration of sodium diacetate will depend upon the particular material being treated and may naturally be much greater with some materials than with others. In its broader aspects the invention contemplates the use of other acetate salts containing combined but undissociated acetic acid, more particularly non-toxic soluble salts, for instance, the alkali metal (e. g., Na, K) salts.

Reference is hereby made to our co-pending application, Serial No. 347,156, filed July 24, 1940, covering certain generic aspects of the invention not claimed herein.

Having thus described the invention, what we claim as new and desire to secure by Letters Patent of the United States is:

1. The method of making bakery products from a fermented dough which comprises incorporating into the dough prior to baking rope and mold inhibiting quantities of a non-toxic water soluble acetate salt containing combined but undissociated acetic acid.

2. The method of making bread from a fermented dough which comprises incorporating into the bread prior to baking about 0.01% to about 0.5%, based on the weight of flour, of an alkali diacetate.

3. The method of making bakery products from a fermented dough which comprises incorporating into the bread dough prior to baking about 0.05% to about 0.2% of sodium diacetate.

4. A method of inhibiting the growth of rope and mold in bread which comprises incorporating into the bread prior to baking rope and mold inhibiting quantities of sodium diacetate.

5. The method of making white bread from a fermented dough which comprises incorporating into the bread dough prior to baking a quantity of sodium diacetate effective in increasing proteolytic activity of the dough.

6. The method of making white bread from a fermented dough which comprises incorporating into the bread dough prior to baking a quantity of sodium diacetate effective in producing a whiter crum color.

7. The method of making white bread from a fermented dough which comprises incorporating into the bread dough prior to baking rope and mold inhibiting quantities of a non-toxic water soluble acetate salt containing 20% to 40% combined but undissociated acetic acid, in an amount not exceeding about 0.2% based on the weight of the finished bread.

8. The method of making bread from a fermented dough which comprises incorporating into the bread dough during the dough stage a quantity of sodium diacetate within the range of about 0.07% to about 0.2% based upon the weight of the finished loaf.

9. The method of making bread from fermented dough which comprises making a sponge containing flour, water, yeast and yeast food, incorporating rope and mold inhibiting quantities of sodium diacetate into said sponge, fermenting the resultant sponge, thereafter incorporating said sponge into a bread dough together with a small quantity of sodium diacetate, and thereafter baking the dough.

10. The method of making bread which comprises making a sponge containing flour, water, yeast and yeast food, fermenting the resultant sponge, incorporating said sponge into a bread dough, incorporating into said bread dough rope and mold inhibiting quantities of sodium diacetate and thereafter baking the dough.

11. The method of making bakery products from a fermented dough made from flour which comprises incorporating into the dough about 1% to about 10% by weight of the flour of a composition consisting substantially of a malted cereal flour, a partially dextrinized gluten modified flour and a high soluble dextrine intimately associated with about 2% to about 6% by weight of said composition of a non-toxic water soluble acetate salt containing combined but undissociated acetic acid.

12. The method of making bakery products from fermented dough made from flour which comprises incorporating into the dough a yeast food comprising an ammonium salt and an oxidizing agent, and rope and mold inhibiting quantities of a non-toxic water soluble acetate salt containing combined but undissociated acetic acid.

13. As a new article of manufacture, bread containing rope and mold inhibiting quantities of a non-toxic, soluble acetate salt containing combined but undissociated acetic acid.

14. As a new article of manufacture, bread made from fermented dough and containing a small amount of sodium diacetate corresponding to about 0.05% to about 0.2% by weight of the bread.

15. As a new article of manufacture, bread made from fermented dough and containing rope and mold retarding quantities of sodium diacetate.

16. As a new article of manufacture, a composition for use in making bakery products comprising a malted cereal flour, a partially dextrinized gluten modified flour, a dextrinized starch and a non-toxic water soluble acetate salt containing combined but undissociated acetic acid, said salt being intimately associated with said other ingredients in proportions of about 2% to about 20% by weight.

17. As a new article of manufacture, a composition consisting substantially of a yeast food comprising an ammonium salt and an oxidizing agent, intimately associated with a rope and mold inhibiting quantity of a non-toxic water soluble acetate salt containing combined but undissociated acetic acid.

18. A bakery product comprising rope and mold inhibiting quantities of a non-toxic water soluble acetate salt containing combined but undissociated acetic acid.

19. A bakery product comprising about .05% to about 0.5% of sodium diacetate.

HANS F. BAUER.
ELMER F. GLABE.